US007040987B2

(12) United States Patent
Walker et al.

(10) Patent No.: US 7,040,987 B2
(45) Date of Patent: May 9, 2006

(54) METHOD AND APPARATUS FOR REMOTELY CUSTOMIZING A GAMING DEVICE

(75) Inventors: Jay S. Walker, Ridgefield, CT (US); James A. Jorasch, Stamford, CT (US); Geoffrey M. Gelman, Stamford, CT (US); Steven M. Santisi, Ridgefield, CT (US)

(73) Assignee: Walker Digital, LLC, Stamford, CT (US)

( * ) Notice: Subject to any disclaimer, the term of this patent is extended or adjusted under 35 U.S.C. 154(b) by 378 days.

(21) Appl. No.: 10/121,263

(22) Filed: Apr. 11, 2002

(65) Prior Publication Data

US 2002/0151366 A1 Oct. 17, 2002

Related U.S. Application Data

(60) Provisional application No. 60/283,086, filed on Apr. 11, 2001.

(51) Int. Cl.
*A63F 13/00* (2006.01)

(52) U.S. Cl. .................................................. 463/42

(58) Field of Classification Search ............ 463/12–13, 463/16–22, 25, 29–31, 40–43; 273/143 R
See application file for complete search history.

(56) References Cited

U.S. PATENT DOCUMENTS

| | | | | |
|---|---|---|---|---|
| 4,760,245 | A | 7/1988 | Fukaya | |
| 5,132,900 | A | 7/1992 | Gilchrist et al. | |
| 5,259,613 | A | 11/1993 | Marnell, II | |
| 5,459,825 | A | 10/1995 | Anderson et al. | |
| 5,561,811 | A | 10/1996 | Bier | |
| 5,859,416 | A | 1/1999 | Gatto | |
| 6,009,458 | A | 12/1999 | Hawkins et al. | |
| 6,219,836 | B1 | 4/2001 | Wells et al. | |
| 6,350,199 | B1 | 2/2002 | Williams et al. | |
| 6,358,150 | B1 | 3/2002 | Mir et al. | |
| 6,645,077 | B1 * | 11/2003 | Rowe | 463/42 |
| 2002/0142825 | A1 | 10/2002 | Lark et al. | |
| 2002/0142846 | A1 * | 10/2002 | Paulsen | 463/43 |

OTHER PUBLICATIONS

Copy of Office Action (mailed Jun. 16, 2004) for U.S. Appl. No. 10/174,432 entitled "Method And Apparatus For Planning And Customizing A Gaming Experience", filed Jun. 17, 2002 in the name of Walker et al., Examiner Julie K. Brocketti.

* cited by examiner

*Primary Examiner*—Kim Nguyen
(74) *Attorney, Agent, or Firm*—Magdalena M. Fincham

(57) ABSTRACT

The invention includes a system and method for remotely configuring gaming devices. Initially, a central controller receives configuration data from a player at a remote user terminal. A customization code is then determined and associated with the configuration data. The configuration data and the associated customization code are transmitted from the central controller to a casino server. The casino server waits for a configuration request that includes the customization code from the player at the gaming device. Finally, the gaming device is actually configured according to the configuration data associated with a customization code received from a player at the gaming device.

30 Claims, 10 Drawing Sheets

610

| PLAYER IDENTIFIER 700 | NAME 702 | FINANCIAL ACCOUNT IDENTIFIER 704 | DEMOGRAPHIC 706 | MACHINE IDENTIFIER 708 | LIFETIME THEORETICAL WIN 710 |
|---|---|---|---|---|---|
| 111123P | SAM BROWN | 1111-1111-1111-1111 | MALE, AGE 23 | 234M | $2345 |
| 222234P | LINDA JONES | 2222-2222-2222-2222 | FEMALE, AGE 47 | 532M | $765 |

FIG. 7

208

| CUSTOMIZATION CODE 800 | GAME TYPE 802 | DENOMINATION 804 | LANGUAGE 806 | CURRENCY 808 | NOISE LEVEL 810 | FONT SIZE 812 |
|---|---|---|---|---|---|---|
| C5006 | REEL SLOTS | $1.00 | ENGLISH | US DOLLAR | HIGH | MEDIUM |
| C9224 | VIDEO POKER | $0.25 | ENGLISH | US DOLLAR | MEDIUM | SMALL |
| C8331 | BLACKJACK | $5.00 | JAPANESE | YEN | LOW | LARGE |

FIG. 8

METHOD AND APPARATUS FOR REMOTELY CUSTOMIZING A GAMING DEVICE

RELATED APPLICATIONS

This application claims priority to commonly-owned, co-pending U.S. Provisional Patent Application Ser. No. 60/283,086, filed Apr. 11, 2001, entitled "Slot Machine Customization Via Internet"; which is incorporated herein by reference in its entirety for all purposes.

This application is related to commonly-owned, U.S. patent application Ser. No. 09/962,065, filed Sep. 25, 2001, entitled "Method and System for Adapting Casino Gaines to Playing Preferences", and commonly-owned, U.S. patent application Ser. No. 09/521,875, filed Mar. 8, 2000, entitled "A Gaming Device and Method of Operation Thereof," issued as U.S. Pat. No. 6,520,856 B1 on Feb. 18, 2003, which are incorporated herein by reference in their entirety for all purposes.

FIELD OF THE INVENTION

The present invention relates to methods and apparatus for configuring gaming or other devices. More specifically, the present invention relates to permitting a player, or others, to remotely customize a gaming device according to the player's desired configuration or the player's characteristics.

BACKGROUND OF THE INVENTION

There are currently over 500,000 slot machines in operation that generate more than $15 billion in annual revenue for United States casinos. Most casinos generate more than half of their gaming revenues from slot machines and some individual casinos offer two or three thousand slot machines at a single location.

For players, finding a machine that they like can be very difficult. For example, a player looking for a "Full Pay Jacks or Better" video poker machine might spend half an hour or more looking for one, only to find that the casino does not have one. Such a frustrated player might then be tempted to just leave to try another casino. Even upon finding a preferred game, the player may discover that there are elements of the game that he does not like (e.g. the type font is too small, or the cards are dealt too fast). What is needed is a system and method that enables a player to quickly and easily locate a suitable gaming device without having to hunt through thousands of other gaming devices.

SUMMARY OF THE INVENTION

The present invention overcomes the above and other drawbacks of the prior art by offering a system that, according to some embodiments, allows a player to define and save a configuration and/or a customization of a gaming device. Upon arrival at a casino, the player may immediately gamble with the saved customized configuration on any available gaming device that embodies the present invention.

According to some embodiments of the present invention, a gaming device may be customized by a player over the Internet. By logging on to a central controller, the player may be provided with a menu of game types and a series of potential customization options. After providing customization data, the player may be given a customization code that can be entered into any slot machine to reconfigure it with the stored customizations. For example, a user may log on to the Internet via a personal computer and access a casino website for customizing slot machines. The user may select from among several game types (e.g. deuces-wild, jacks or better, video reel, three reel, five reel, video poker, blackjack, etc.) and proceed to configure the game to his liking. For example, the user may set a default game denomination, a game starting point, rules for making automatic play decisions, game rules, a color scheme, a level of help, a bonus frequency, a bonus duration, a speed of reel spin, a font size and/or style, a currency type, a sound type, a sound level, a language, a currency, a payout structure, a payout amount, a payout option, a team option, a comp format, a jackpot probability, etc. After completing the customization, the user may be provided with a customization code. When the user arrives at a casino and sits down at a slot machine, he enters his customization code and the game reconfigures itself to the user's previously provided customizations.

In some embodiments of the disclosed invention, information about a player may be used to provide targeted advertising and/or targeted marketing offers to the player. For example, a user may log on to a central controller (i.e. the customization website) and answer a series of questions about himself. For example, he might identify his age, sex, whether or not he owns a home, the types of magazines he buys, whether he has any children, whether he has any stock investments, his blood pressure and cholesterol levels, his education level, the identity of his long distance phone carrier, etc. The answers to these questions are stored along with an associated customization code and transmitted to the casino server. When the player arrives at a casino and sits down at a gaming device to play, he enters his customization code, which is then transmitted to the casino server. During the gambling session, if it is determined that a marketing offer should be provided to the player, then the marketing answers are retrieved and used to better target the marketing offer. An offer to switch long distance service from AT&T® to MCI®, for example, might be skipped in favor of another offer if the player is already an MCI® customer.

In some embodiments, rather than receiving customization data from the player, the casino stores customization information about the player. For example, if the player is a frequent gambler, the casino might activate a comp payout percentage of two percent (2%) instead of the more typical one percent (1%). In some embodiments, instead of logging on to the central controller, the player may log directly into a casino server or a slot machine. The connection might be through the Internet or via a direct dial/WAN connection. Customization data may be provided as described above. In this embodiment, the player might be able to retrieve information from the casino about his play. The player may provide his player tracking identifier (and possibly a PIN code for security) to gain access to his account. The player may also check to see how much he has won for IRS tax reporting purposes, for example.

With these and other advantages and features of the invention that will become hereinafter apparent, the nature of the invention may be more clearly understood by reference to the following detailed description of the invention, the appended claims and to the several drawings included herein.

BRIEF DESCRIPTION OF THE DRAWINGS

FIG. 7 is a table illustrating an example data structure of an example player database 610 as depicted in FIG. 6 for use in some embodiments of the present invention.

FIG. 8 is a table illustrating an example data structure of an example customization database 208 as depicted in FIG. 2 for use in some embodiments of the present invention.

DETAILED DESCRIPTION OF THE INVENTION

Figure 1A:
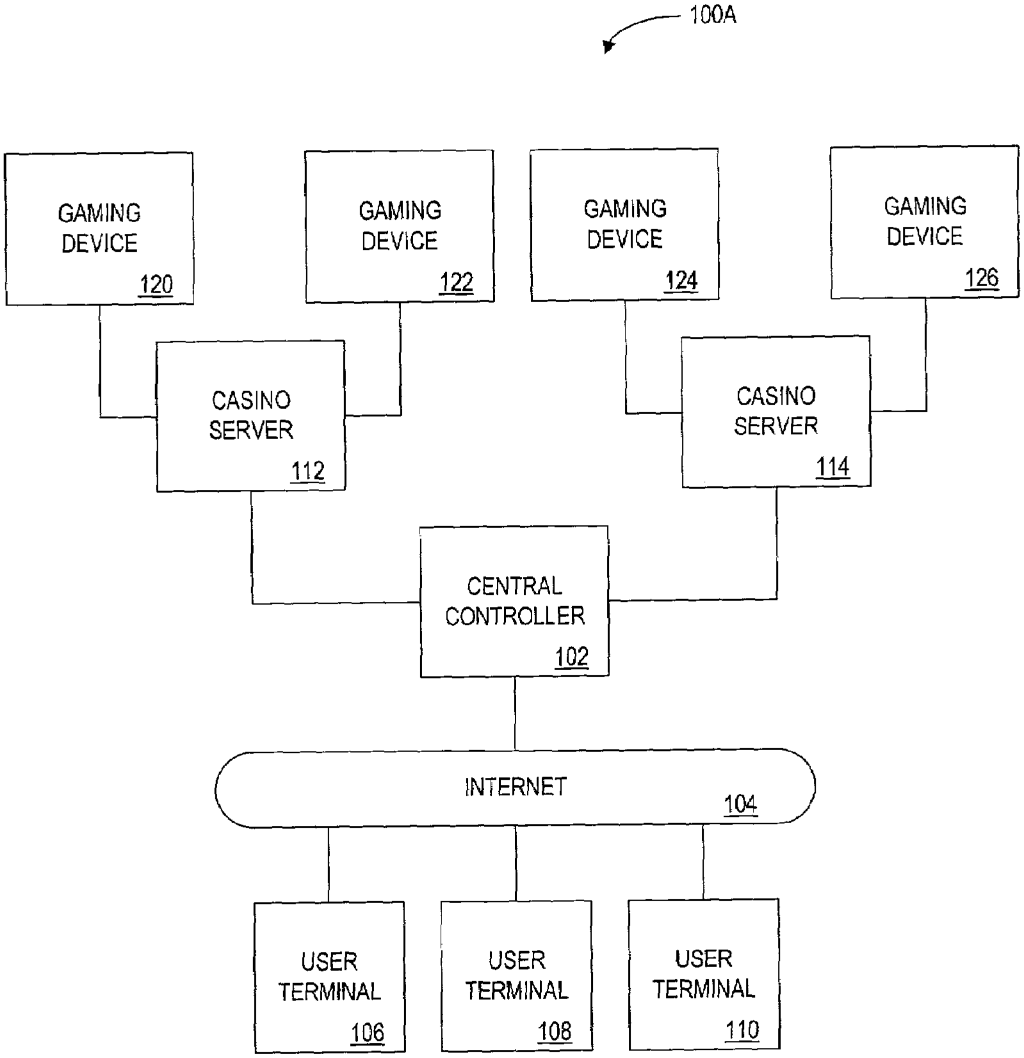
FIG. 1A is a block diagram illustrating an example system according to some embodiments of the present invention.

In the following description, reference is made to the accompanying drawings that form a part hereof, and in which is shown, by way of illustration, specific embodiments in which the invention may be practiced. These embodiments are described in sufficient detail to enable those skilled in the art to practice the invention, and it is to be understood that other embodiments may be utilized and that structural, logical, software, and electrical changes may be made without departing from the scope of the present invention. The following description is, therefore, not to be taken in a limited sense, and the scope of the present invention is defined by the appended claims.

Applicants have recognized that a need exists for systems and methods that enable players to quickly and easily locate suitable gaming devices 120, 122, 124, 126 without having to hunt through thousands of other gaming devices. One particular benefit to players of embodiments of the present invention is that players are able to cause a gaming device 120 to instantly conform to their individual player preferences upon presentation of a customization code. The players do not need to waste time wading through an elaborate maze of configuration options instead of actually using time at the casino to play the games. A second benefit to the players is that marketing offers presented via a gaming device 120 may be much more targeted which results in less time wasted by the players having to reject offers that are not appropriate. Benefits of the present invention to the casino include: (1) players no longer leave the casino if they do not find their preferred machines; (2) players play longer when the machine is configured for their needs; and (3) players accept more marketing offers when they are better targeted. Benefits to gaming device manufacturers include (1) acquiring player customization information is valuable and useful in developing new gaming devices and (2) manufactures will sell more customization software for gaming devices.

A. Definitions

Throughout the description that follows and unless otherwise defined, the following terms will refer to the meanings provided in this section. These terms are provided to clarify the language selected to describe the embodiments of the invention both in the specification and in the appended claims.

The terms "products," "goods," "merchandise," and "services" shall be synonymous and refer to anything licensed, leased, sold, available for sale, available for lease, available for licensing, and/or offered or presented for sale, lease, or licensing including packages of products, subscriptions to products, contracts, information, services, and intangibles.

The term "merchant" shall refer to an entity who may offer to sell, lease, and/or license a product to a consumer for the consumer or on behalf of another. For example, merchants may include sales channels, individuals, companies, manufactures, distributors, direct sellers, resellers, and/or retailers. Merchants may transact out of buildings including stores, outlets, malls and warehouses, and/or they may transact via any number of additional methods including mail order catalogs, vending machines, online web sites, and/or via telephone marketing. Note that a manufacturer may choose not to sell to customers directly and in such a case, a retailer may serve as the manufacture's sales channel.

The terms "player" and "user" shall be synonymous and refer to any person or entity that operates a gaming device and/or a user terminal.

The term "gaming device" shall refer to any gaming machine, including slot machines, video poker machines, video bingo machines, video keno machines, video blackjack machines, arcade games, video games, video lottery terminals, online gaming systems, etc. Gaming devices may or may not be owned and/or maintained by a casino and/or may or may not exist within a casino location.

The term "casino" shall refer to the owner of gaming devices, owners' agents, and/or any entity who may profit from players' use of the gaming devices.

The term "casino location" shall refer to the physical geographic site, complex, or building where gaming devices owned and/or operated by a casino are located. In the case of an online casino, casino location shall refer to the address (e.g. the uniform resource locator (URL))of the online casino's website or facility.

The term "central controller" shall refer to a device that may communicate with one or more casino servers and/or one or more gaming devices and/or one or more third-party service provider servers and/or one or more remote controllers and/or one or more player devices, and may be capable of relaying communications to and from each.

The term "user terminal" and "remote controller" shall be synonymous and refer to a device that may communicate with one or more casino servers and/or one or more gaming devices and/or one or more third-party service provider servers and/or one or more player devices. User terminals may, for example, include personal computers, laptop computers, handheld computers, telephones, kiosks, automated teller machines, gaming devices, game consoles, and/or vending machines. They may be used to access configuration selection programs, to execute such programs, and/or to configure gaming devices. They may include facilities to support secure communications using encryption or the like.

The term "player device" shall refer to a device that may communicate with one or more casino servers and/or one or more gaming devices and/or one or more third-party service provider servers and/or one or more user terminals. Player devices may, for example, include cell phones, pagers, personal digital assistants, and combinations of such devices. They may be used to access configuration selection programs, to execute such programs, and/or to configure gaming devices.

The term "input device" shall refer to a device that is used to receive an input. An input device may communicate with or be part of another device (e.g. a point of sale terminal, a point of display terminal, a user terminal, a server, a player device, a gaming device, a controller, etc.). Some examples of input devices include: a bar-code scanner, a magnetic stripe reader, a computer keyboard, a point-of-sale terminal keypad, a touch-screen, a microphone, an infrared sensor, a sonic ranger, a computer port, a video camera, a motion detector, a digital camera, a network card, a universal serial bus (USB) port, a GPS receiver, a radio frequency identification (RFID) receiver, a RF receiver, a thermometer, a pressure sensor, and a weight scale.

The term "output device" shall refer to a device that is used to output information. An output device may communicate with or be part of another device (e.g. a gaming device, a point of sale terminal, a point of display terminal, a player device, a merchant device, a controller, etc.). Possible output devices include: a cathode ray tube (CRT) monitor, liquid crystal display (LCD) screen, light emitting diode (LED) screen, a printer, an audio speaker, an infra-red transmitter, a radio transmitter.

The term "I/0 device" shall refer to any combination of input and/or output devices.

The term "frequent shopper card" shall refer to a device that may be capable of storing information about a consumer who is a shopper. This information may include identifying information and shopping history information. The frequent shopper card may be machine readable, for example, by a POS terminal. According to some embodiments of the present invention, a frequent shopper card may store gaming device customized configuration information.

The term "player tracking card" shall refer to a device that may be capable of storing information about a consumer who is a casino player. Typically player tracking cards may be accessed by gaming devices and magnetic card readers operated by casino staff. The information stored on the player tracking card may include identifying information, as well as financial information, such as a number of gambling credits remaining. The card may be machine readable, for example, by a gaming device. According to some embodiments of the present invention, a player tracking card may store gaming device customized configuration information.

The term "ATM card" shall refer to a device that may be capable of storing information about a consumer who is a bank customer. This information may include identifying information and bank account information. The ATM card may be machine readable, for example, by an automated teller machine. According to some embodiments of the present invention, an ATM card may store gaming device customized configuration information.

The term "configuration" shall refer to one or more feature values, preferences, or selections for the operation of a gaming or other device.

The term "customized configuration" shall refer to a configuration designed or chosen by a player for his own use.

The term "configuration data" shall refer to a customized configuration and, in addition, information about the player that may be useful to casinos or third-parties who may attempt to configure a gaming device to some degree for the player. For example, a marketing company may use the information about the player to create a targeted advertisement that may be configured to be presented to the player via the gaming device.

The term "customization code" shall refer to a code used to identify a set of stored player preferences. In some embodiments, the customization code is the player's player tracking card number.

The term "feature" shall refer to an individual aspect of the operation of a gaming (or other) device, or a user's experience with the gaming (or other) device. Individual features might include the reel speed, the payout percentage, or the contrast of the video screen on a slot machine. A set of features taken together represents a configuration for a gaming device.

B. System

Figure 2:
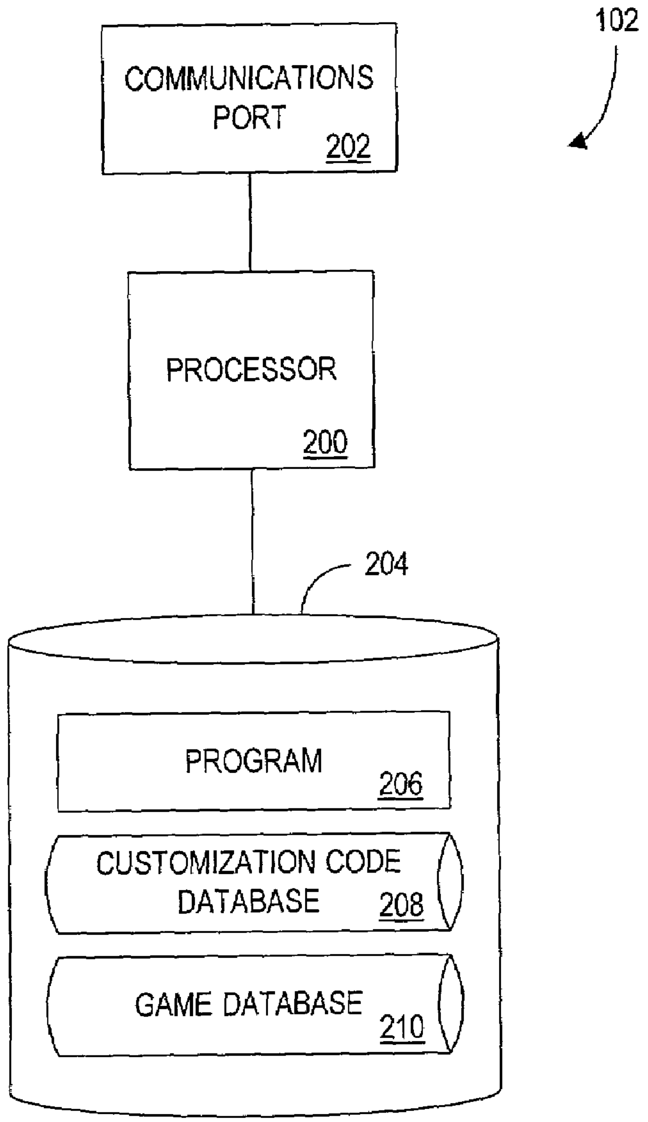
FIG. 2 is a block diagram illustrating an example of a central controller 102 as depicted in FIGS. 1A and 1B according to some embodiments of the present invention.
Figure 3:
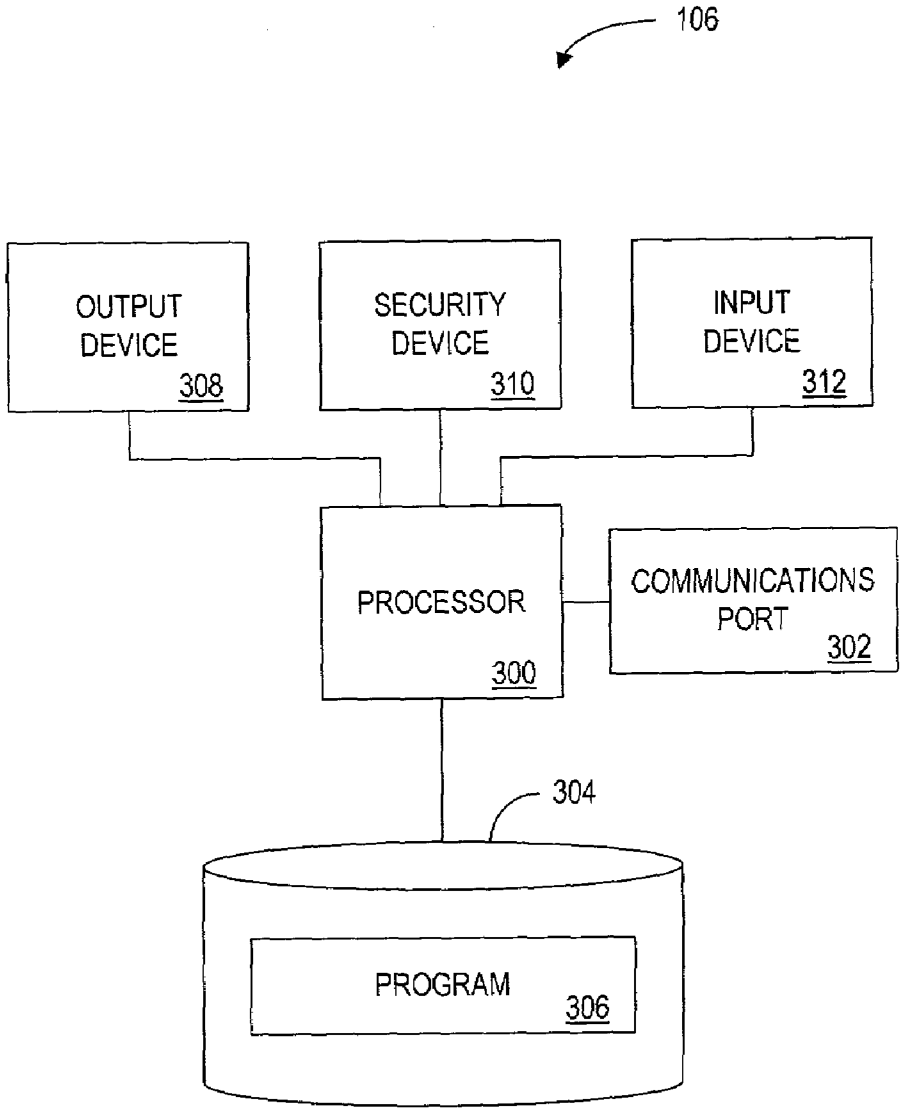
FIG. 3 is a block diagram illustrating an example of a user terminal 106 as depicted in FIGS. 1A and 1B according to some embodiments of the present invention.
Figure 5:
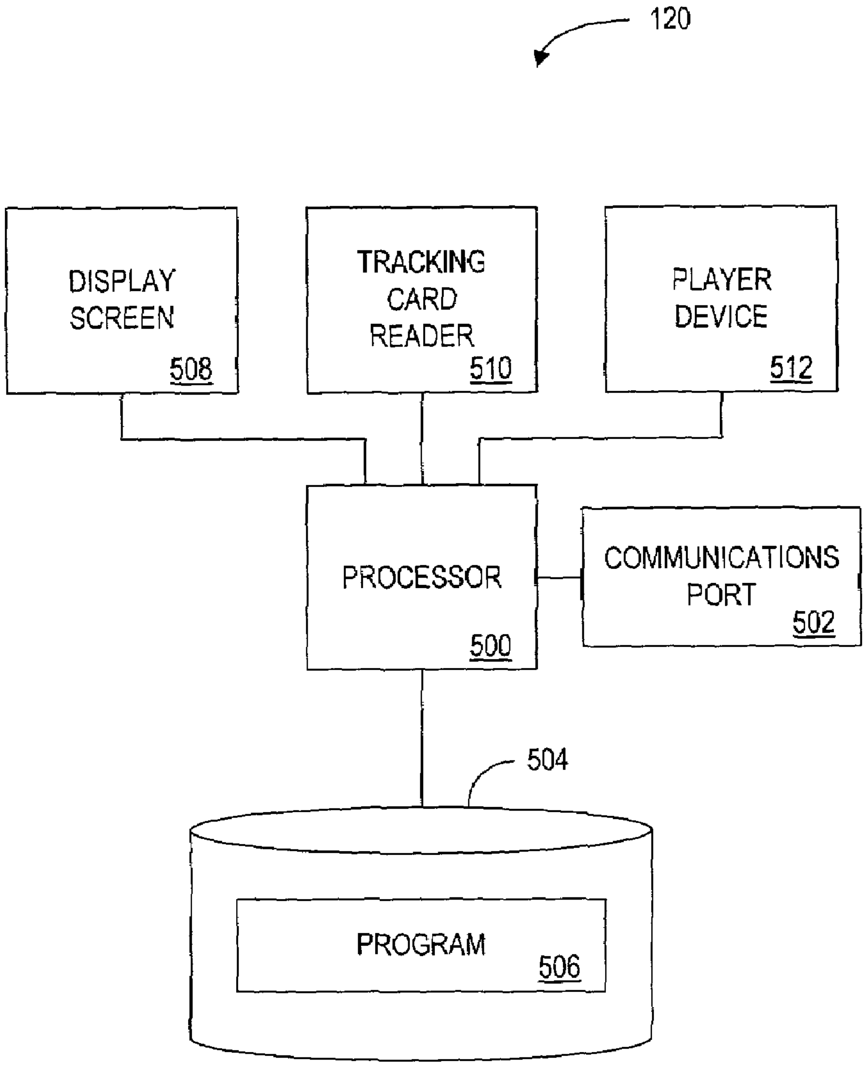
FIG. 5 is a block diagram illustrating an example of a gaming device 120 as depicted in FIGS. 1A and 1B according to some embodiments of the present invention.
Figure 6:
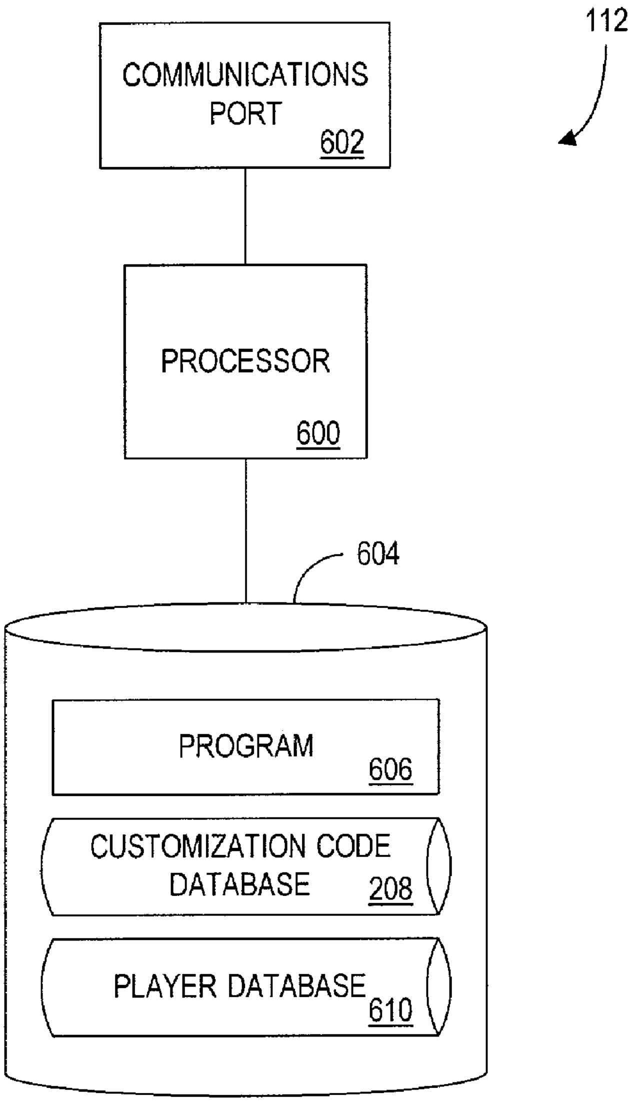
FIG. 6 is a block diagram illustrating an example of a casino server 112 as depicted in FIGS. 1A and 1B according to some embodiments of the present invention.

An example embodiment of the system 100A of the present invention is depicted in FIG. 1A. The system 100A according to some embodiments of the present invention may include a central controller 102 (an example of which is depicted in FIG. 2) in one or two-way communication with one or more casino servers 112, 114 (an example of which is depicted in FIG. 6) and one or more user terminals 106, 108, 110 (an example of which is depicted in FIG. 3) via a network, for example, the Internet 104 or via another communications link. Casino servers 112, 114, in turn, are each in communication with one or more gaming devices 120, 122, 124, 126 (an example of which is depicted in FIG. 5). The devices shown connected directly together in FIG. 1 may alternatively be connected via a network, for example, a local area network, the Internet 104 and/or via another communications link.

In operation, the central controller 102 may function under the control of a casino, a merchant, or other entity that may also control use of the gaming devices 120, 122, 124, 126. For example, the central controller 102 may be a server in a merchant's network. In some embodiments, the central controller 102 and the casino servers 112, 114 may be one and the same.

Figure 1B:
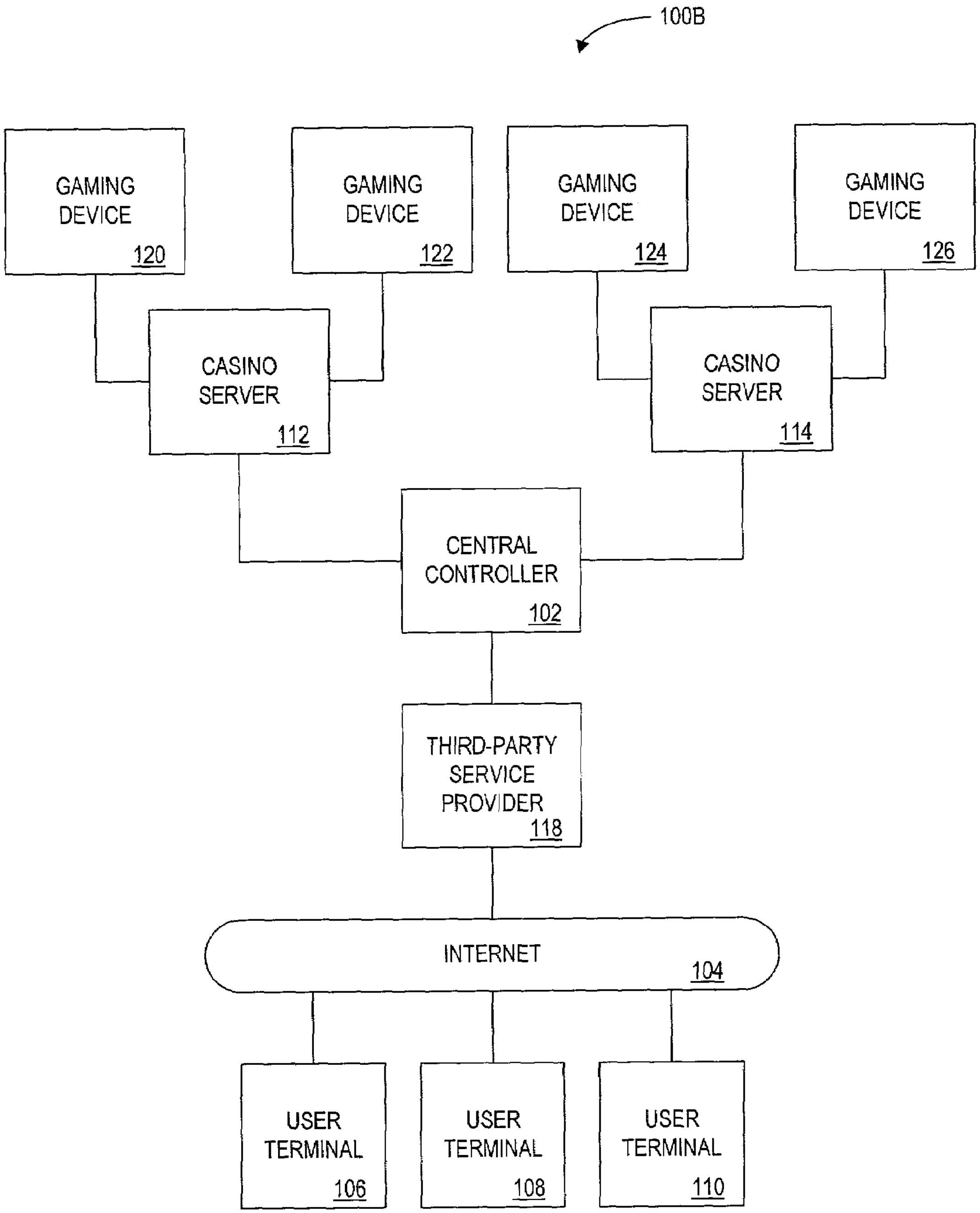
FIG. 1B is a block diagram illustrating an alternative example system according to some embodiments of the present invention.

Referring to FIG. 1B, an alternative system 100B according to some other embodiments of the present invention further includes one or more third-party service provider servers 118. A third-party service provider server 118 may also be in one or two-way communication with the central controller 102. However, as shown in the embodiment depicted in FIG. 1B, the third-party service provider server 118 may be disposed between the central controller 102 and the user terminals 106, 108, 110. Alternatively, the third-party service provider server 118 may be disposed between the central controller 102 and the casino servers 112, 114.

The primary difference between the two alternative embodiments depicted in FIGS. 1A and 1B is that the embodiment of FIG. 1B includes the third-party service provider server 118 which may be operable by an entity both distinct and physically remote from the entity operating the central controller 102. In operation, the third-party service provider server 118 may perform the methods of the present invention by sending signals to the central controller 102 to be relayed to the user terminals 106, 108, 110. For example, a marketing company may operate a third-party service provider server 118 that communicates with a slot machine manufacturing company server (functioning as a central controller 102) to provide players with marketing offers based on player information gathered via user terminals 106, 108, 110 and/or gaming devices 120, 122, 124, 126. In the embodiment of FIG. 1A, the functions of the third-party service provider server 118 may be consolidated into the central controller 102.

An additional difference between these two embodiments relates to the physical topology of the systems 100A and 100B. In both of the depicted embodiments, each node may securely communicate with every other node in the system 100A, 100B via, for example, a virtual private network (VPN). Thus, all nodes may be logically connected. However, the embodiment depicted in FIG. 1B allows the third-party service provider server 118 to optionally serve as a single gateway between the nodes that will typically be under the control of one or more casinos (and players within the casinos' location) and the other nodes in the system 100B, i.e. nodes that may be operated by players outside of the casinos' location. In some embodiments of the present invention, the centralization and control that naturally results from this topology is useful in monitoring player's use of the system to make such determinations as, for example, which configurations are the most popular or how many players are currently configuring a gaming device 120.

In some embodiments, the casino servers 112, 114 may each be controlled by different casinos. The central controller 102 may be operated by an entity that uses the present invention to, for example, deliver players to the different casinos. If there is a third-party service provider server 118, it may be operated by an unrelated entity that merely permits the operators of the central controller 102 to have access to players who are operating the user terminals 106, 108, 110 or the gaming devices 120, 122, 124, 126. Thus, in such an example embodiment, the system of the present invention may involve multiple casinos (operating casino servers 112, 114, 116), a merchant such as a customer acquisition service agent (operating the central controller 102), third-party network operators (operating third-party service provider servers 118), and players (operating user terminals 106, 108, 110 and gaming devices 120, 122, 124, 126). In alternative embodiments, a casino may operate a combined central controller/casino server directly and the system may only involve a casino and players.

In both embodiments pictured in FIGS. 1A and 1B, communication between the central controller 102, the casino servers 112, 114, the user terminals 106, 108, 110, the gaming devices 120, 122, 124, 126 and/or the third-party service provider server 118, may be direct and/or via a network such as the Internet 104.

Referring to both FIGS. 1A and 1B, each of the central controller 102, (the third-party service provider server 118 of FIG. 1B), the casino servers 112, 114, gaming devices 120, 122, 124, 126, and the user terminals 106, 108, 110 may comprise, for example, computers, such as those based on the Intel® Pentium® processor, that are adapted to communicate with each other. Any number of third-party service provider servers 118, casino servers 112, 114, 116, gaming devices 120, 122, 124, 126, and/or user terminals 106, 108, 110 may be in communication with the central controller 102. In addition, the user terminals 106, 108, 110 may be in direct or indirect, one or two-way communication with the casino servers 112, 114, and/or the gaming devices 120, 122, 124, 126. The central controller 102, the third-party service provider server 118, the casino servers 112, 114, gaming devices 120, 122, 124,126, and the user terminals 106, 108, 110 may each be physically proximate to each other or geographically remote from each other. The central controller 102, the third-party service provider server 118, the casino servers 112, 114, gaming devices 120, 122, 124, 126, and the user terminals 106, 108, 110 may each include input devices 202, 302, 312, 400, 502, 510, 512, 602 and output devices 202, 302, 308, 400, 502, 508, 602.

As indicated above, communication between the central controller 102, the third-party service provider server 118, the casino servers 112, 114, gaming devices 120, 122, 124,126, and the user terminals 106, 108, 110 may be direct or indirect, such as over an Internet Protocol (IP) network such as the Internet 104, an intranet, or an extranet through a web site maintained by the central controller 102 (and/or the third-party service provider server 118) on a remote server or over an on-line data network including commercial on-line service providers, bulletin board systems, routers, gateways, and the like. In yet other embodiments, the devices may communicate with the central controller 102 over local area networks including Ethernet, Token Ring, and the like, radio frequency communications, infrared communications, microwave communications, cable television systems, satellite links, Wide Area Networks (WAN), Asynchronous Transfer Mode (ATM) networks, Public Switched Telephone Network (PSTN), other wireless networks, and the like.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet 104 may not transmit data to the other device for weeks at a time.

The central controller 102 (and/or the third-party service provider server 118) may function as a "web server" that presents and/or generates web pages which are documents stored on Internet-connected computers accessible via the World Wide Web using protocols such as, e.g., the hyper-text transfer protocol ("HTTP"). Such documents typically include one or more hyper-text markup language ("HTML") files, associated graphics, and script files. A web server allows communication with the central controller 102 in a manner known in the art. The gaming devices 120, 122, 124, 126 and the user terminals 106, 108, 110 may use a web browser, such as NAVIGATOR® published by NETSCAPE® for accessing HTML forms generated or maintained by or on behalf of the central controller 102 and/or the third-party service provider server 118.

As indicated above, any or all of the central controller 102, the third-party service provider server 118, the casino servers 112, 114, gaming devices 120, 122, 124, 126, and the user terminals 106, 108, 110 may include, e.g., processor based cash registers, telephones, interactive voice response (IVR) systems such as the ML400-IVR designed by MISSING LINK INTERACTIVE VOICE RESPONSE SYSTEMS, cellular/wireless phones, vending machines, pagers, gaming devices including slot machines, personal computers, portable types of computers, such as a laptop computer, a wearable computer, a palm-top computer, a hand-held computer, a smart card, and/or a Personal Digital Assistant ("PDA"). Further details of the central controller 102, the third-party service provider server 118, the casino servers 112, 114, gaming devices 120, 122, 124, 126, and the user terminals 106,108,110 are provided below with respect to FIGS. 2 through 6.

As indicated above, in some embodiments of the invention, the central controller 102 (and/or the third-party service provider server 118) may include casino servers 112, 114, and/or user terminals 106, 108, 110. Further, the central controller 102 may communicate with gaming devices 120, 122, 124, 126 and players via gaming devices 120, 122, 124, 126 directly instead of through the casino servers 112, 114. In addition, the central controller 102 may communicate with players directly instead of through the user terminals 106, 108, 110 or gaming devices 120, 122, 124, 126. Although not pictured, the central controller 102, the third-party service provider server 118, the casino servers 112, 114, gaming devices 120, 122, 124, 126, and the user terminals 106, 108, 110 may also be in communication with one or more consumer and/or merchant credit institutions to effect transactions and may do so directly or via a secure financial network such as the Fedwire network maintained by the U.S. Federal Reserve System, the Automated Clearing House (ACH) Network, the Clearing House Interbank Payments System (CHIPS), or the like.

In operation, the casino servers 112, 114 and/or the user terminals 106, 108, 110 may exchange information about the player and the player's gaming device configuration via the central controller 102. In embodiments with a third-party service provider server 118, the casino servers 112, 114, and/or the user terminals 106, 108, 110 and/or the gaming devices 120, 122, 124, 126 may exchange information about the player via the third-party service provider server 118. The casino servers 112, 114 may for example, provide information related to gaming device configurations or other information to the central controller 102 (and/or the third-party service provider server 118). The user terminals 106, 108, 110 may provide player configuration selection information to the central controller 102 (and/or the third-party service provider server 118). The central controller 102 (and/or the third-party service provider server 118) may provide information about players and their selected configurations to the casino servers 112, 114 and also configuration codes to the user terminals 106, 108, 110 for later use by players at the gaming devices 120, 122, 124, 126 in the casino location. In some embodiments, upon receiving a configuration code from a gaming device 120, a casino server 112 may communicate instructions to the gaming device 120 to configure itself according to a stored configuration associated with the configuration code.

C. Devices

FIG. 2 is a block diagram illustrating details of an example of the central controller 102 of FIGS. 1A and 1B (and/or an example of a third-party service provider server 118 of FIG. 1B). The central controller 102 is operative to manage the system and execute the methods of the present invention. The central controller 102 may be implemented as one or more system controllers, one or more dedicated hardware circuits, one or more appropriately programmed general purpose computers, or any other similar electronic, mechanical, electromechanical, and/or human operated device. For example, in FIG. 1B, the central controller 102 is depicted as coupled to a third-party service provider server 118. In the embodiment of FIG. 1B, these two servers may provide the same functions as the central controller 102 alone in the embodiment of FIG. 1A.

The central controller 102 (and/or the third-party service provider server 118) may include a processor 200, such as one or more Intel® Pentium® processors. The processor 200 may include or be coupled to one or more clocks or timers (not pictured) and one or more communication ports 202 through which the processor 200 communicates with other devices such as the casino servers 112, 114, the user terminals 106, 108, 110, the gaming devices 120, 122, 124, 126, and/or the third-party service provider server 118. The processor 200 is also in communication with a data storage device 204. The data storage device 204 includes an appropriate combination of magnetic, optical and/or semiconductor memory, and may include, for example, additional processors, communication ports, Random Access Memory ("RAM"), Read-Only Memory ("ROM"), a compact disc and/or a hard disk. The processor 200 and the storage device 204 may each be, for example: (i) located entirely within a single computer or other computing device; or (ii) connected to each other by a remote communication medium, such as a serial port cable, a LAN, a telephone line, radio frequency transceiver, a fiber optic connection or the like. In some embodiments for example, the central controller 102 may comprise one or more computers (or processors 200) that are connected to a remote server computer operative to maintain databases, where the data storage device 204 is comprised of the combination of the remote server computer and the associated databases.

The data storage device 204 stores a program 206 for controlling the processor 200. The processor 200 performs instructions of the program 206, and thereby operates in accordance with the present invention, and particularly in accordance with the methods described in detail herein. The present invention can be embodied as a computer program developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers. The program 206 may be stored in a compressed, uncompiled and/or encrypted format. The program 206 furthermore may include program elements that may be generally useful, such as an operating system, a database management system and "device drivers" for allowing the processor 200 to interface with computer peripheral devices. Appropriate general purpose program elements are known to those skilled in the art, and need not be described in detail herein.

Further, the program 206 is operative to execute a number of invention-specific modules or subroutines which may include (but are not limited to) one or more routines to identify a player at a user terminal 106, 108, 110 as a potential player of a custom configured gaming device; one or more routines to receive information about a player; one or more routines to provide configurable feature information to a player at a user terminal 106, 108, 110; one or more routines to generate a customization code associated with a player's selection of a configuration; one or more routines to store players' gaming device customized configurations; one or more routines to communicate stored customization codes and the associated customized configurations to the casino servers 112, 114, one or more routines to facilitate and control communications between casino servers 112, 114, gaming devices 120, 122, 124, 126, user terminals 106, 108, 110, the central controller 102, and/or a third-party service provider server 118; and one or more routines to control databases or software objects that track information regarding players, casinos, third-parties, user terminals 106, 108, 110, gambling results, customized configurations, customization codes, features, gaming devices 120, 122, 124, 126, and fulfillment. Examples of these routines and their operation are described in detail below in conjunction with the flowchart depicted in FIG. 9.

According to some embodiments of the present invention, the instructions of the program 206 may be read into a main memory of the processor 200 from another computer-readable medium, such from a ROM to a RAM. Execution of sequences of the instructions in the program 206 causes processor 200 to perform the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software.

In addition to the program 206, the storage device 204 is also operative to store (i) a customization code database 208 and (ii) a game database 210. The databases 208, 210 are described in detail below and example structures are depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though two separate databases are illustrated, the invention could be practiced effectively using one, three, four, five, or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention. These processes are described below in detail with respect to FIG. 9.

Turning to FIG. 3, a block diagram of an example user terminal 106 is depicted. A user terminal 106 according to the present invention may include a processor 300 coupled to a communications port 302, a data storage device 304 that stores a user terminal program 306, an output device 308, a security device 310, and an input device 312. A user terminal program 306 may include one or more routines to facilitate and control communications and interaction with the central controller 102 as well as a user interface to facilitate communications and interaction with a player. An example display screen image of such a user interface is provided in FIG. 4. An optional security device 310 provides a facility to support secure communications via encryption, for example.

In addition, a user terminal 106 may include additional devices to support other functions. For example, a user terminal 106 embodied in a personal computer may additionally include a printing device for generating a coupon or a barcode representative of a customization code. In some embodiments, players may be issued cashless gaming receipts that they can print (along with the customization code) as an incentive to follow through and come to a sponsoring casino location. In some embodiments, player devices such as PDAs or cell phones may be used in place of or in addition to user terminals. Many alternative input and output devices may be used in place of the various devices pictured in FIG. 3. Uses of these user terminal 106 components are discussed below in conjunction with the description of the methods of the present invention.

Figure 4:
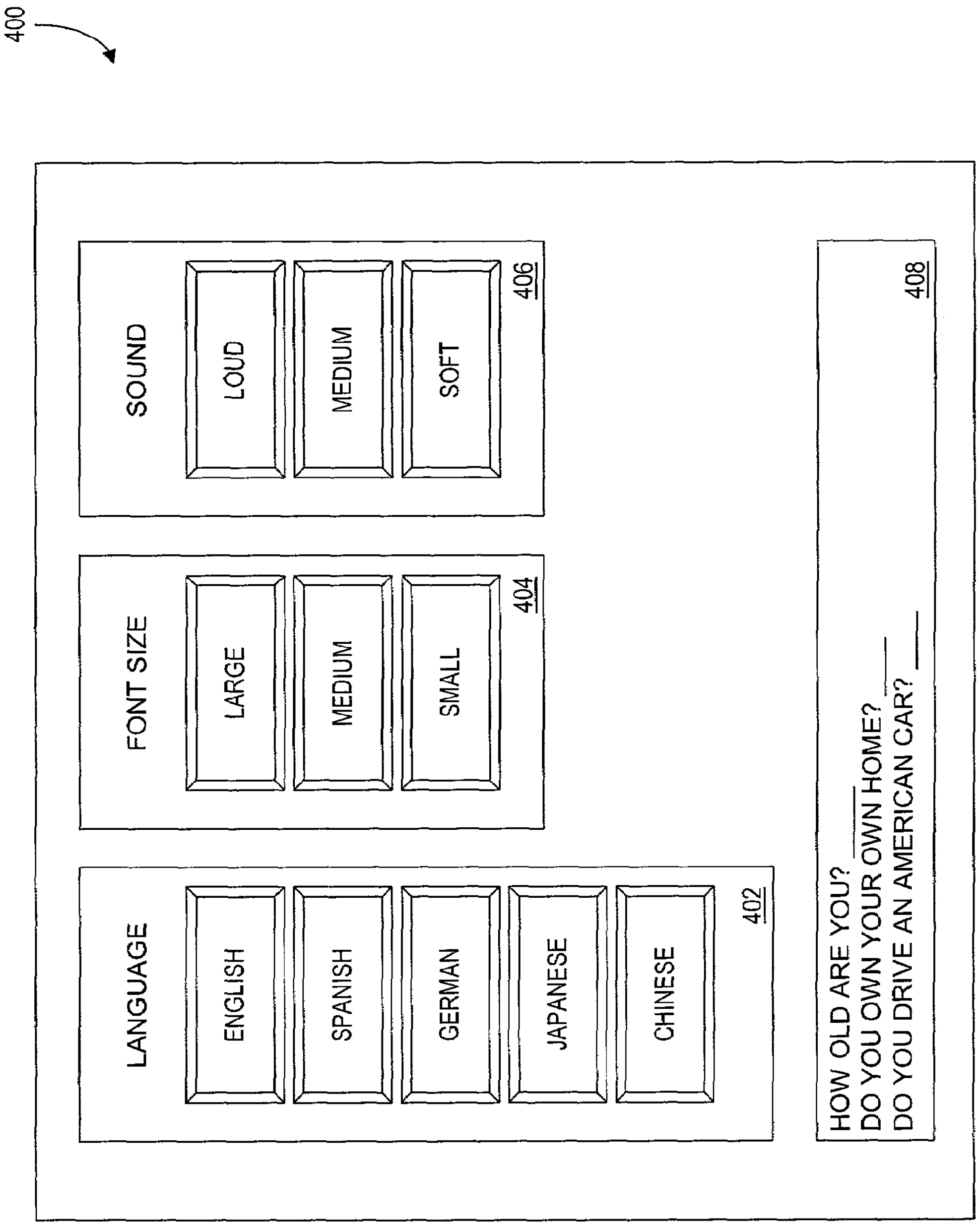
FIG. 4 is a drawing illustrating an example of a customization screen as it may be displayed on a user terminal 106 for use with some embodiments of the present invention.

Turning to FIG. 4, an example embodiment of a configuration customization screen 400 is depicted. Feature selection controls are presented for indicating a language selection 402, a font size selection 404, and a sound level selection 406. In addition, player information questions 408 are also presented. In operation, a user terminal 106 executing a browser program may be used to access a game database 210 on a central controller 102 to retrieve a web page (as depicted in FIG. 4) that presents the feature selection controls and player information questions specific to a particular gaming device 120 available at a casino location the player intends to visit. The user terminal 106 is further operative to communicate the player's selections and responses (together representing a customized configuration) back to the central controller 102 for storage in the customization code database 208. In some embodiments, the customized configuration is stored indexed by a customization code that is provided to the user via the user terminal 106.

Turning to FIG. 5, a block diagram of an example gaming device 120 is depicted. In addition to apparatus to support gaming functions, a gaming device 120 according to the present invention may include a processor 500 coupled to a communications port 502, a data storage device 504 that stores a gaming device program 506, an input device 508, a tracking card reader 510, and in some embodiments, a player device 512. A gaming device program 506 may include one or more routines to facilitate and control communications and interaction with the casino server 112 and/or in some embodiments, an interface to facilitate communications and interaction with the central controller 102, the third-party service provider server 118, and/or a user terminal 106. As suggested by FIG. 5, a gaming device 120 according to some embodiments of the present invention may be implemented by any number of devices such as, for example, a slot machine, a processor based cash register, a telephone, an IVR system, a cellular/wireless phone, a vending machine, a pager, a personal computer, a portable computer such as a laptop, a wearable computer, a palm-top computer, a handheld computer, and/or a PDA. In some embodiments, a player device 512 such as a PDA or cell phone may be used in place of, or in addition to, some or all of the gaming device 106 components depicted in FIG. 5.

In operation, the tracking card reader 210 may be used to identify a player to the system 100A, 100B. In some embodiments, the gaming device program 506 may use the identity of a player determined via the tracking card reader 210 as an index into a copy of the customization code database 208 residing on the casino server 112. Thus, in some embodiments the gaming device 120 is operable to retrieve a customized configuration associated with a player using the player's tracking card information. In some embodiments, the gaming device program 506 may be further operative to configure the gaming device 120 based on the retrieved customized configuration.

Turning to FIG. 6, a block diagram depicting an example a casino server 112 includes a processor 600 coupled to a communications port 602, a data storage device 604 that stores a casino server program 506, a copy of the customization code database 208, and a player database 610. A casino server program 506 may include one or more routines to respond to requests from gaming devices 120, 122, 124, 126 for customized configurations for, in some embodiments, particular players or, in other embodiments, specified customization codes. In other words, a player database 610 provides the casino server program 506 with access to information about specific players while the copy of the customization code database 208 provides access to the customized configurations. In some embodiments, a copy of the customization code database 208 is not stored on the casino server 112 and instead the casino server program 506 accesses the customized configurations stored on the central controller 102.

D. Databases

As indicated above, it should be noted that although the example embodiment depicted in FIGS. 2 and 6 include two particular databases stored in storage devices 204, 604, other database arrangements may be used which would still be in keeping with the spirit and scope of the present invention. In other words, the present invention could be implemented using any number of different database files or data structures, as opposed to the two depicted in FIGS. 2 and 6. Further, the individual database files could be stored on different servers (e.g. located on different storage devices in different geographic locations, such as on a third-party service provider server 118). Likewise, the programs 206, 606 could also be located remotely from the storage devices 204, 604 and/or on another server. As indicated above, the programs 206, 606 include instructions for retrieving, manipulating, and storing data in the databases 208, 210, 610 as necessary to perform the methods of the invention as will be further described below.

1. Player Database

Turning to FIG. 7, a tabular representation of an embodiment of a player database 610 according to some embodiments of the present invention is illustrated. This particular tabular representation of a player database 610 includes sample records or entries which each include information regarding a particular player. In some embodiments of the invention, a player database 610 is used to track such things as player identity, player financial account information, player demographic information, and player gambling performance information. Those skilled in the art will understand that such player database 610 may include any number of entries or additional fields.

The particular tabular representation of a player database 610 depicted in FIG. 7 defines a number of fields for each of the entries or records. The fields may include: (i) a player identifier field 700 that stores a representation uniquely identifying the player; (ii) a name field 702 that stores a representation of the player's name; (iii) a financial account identifier field 704 that stores a representation of a bank account number, a credit card number, or other financial account information needed to charge an account; (iv) a demographic field 706 that stores a representation of a description of demographic information about the player; (v) a machine identifier field 708 that stores a representation uniquely identifying the machine upon which the player played; and (vi) a lifetime theoretical win field 710 that stores a representation of the player's lifetime theoretical win.

The example player database 610 depicted in FIG. 7 provides example data to illustrate the meaning of the information stored in this database embodiment. A player identifier 700 (e.g. "111123P", "22234P") may be used to identify and index the players listed in the player database 610. Two examples of player information are provided: "Sam Brown" with credit card number "1111-1111-1111-1111" is a "male, age 23" who played on gaming device "234M" and ha lifetime theoretical win of "$2,345.00" and "Linda Jones" with bank account number "2222-2222-2222-2222" is a "female, age 47" who played on gaming device "532M" and has a lifetime theoretical win of "$765.00."

2. Customization Code Database

Turning to FIG. 8, a tabular representation of an embodiment of customization code database 208 according to some embodiments of the present invention is illustrated. This particular tabular representation of a customization code database 208 includes three sample records or entries which each include information regarding a particular customization configuration. In some embodiments of the invention, a customization code database 208 is used to track information descriptive of player specified or designed configurations such as the game type, default denomination of play, language, currency, noise level, and font size. Those skilled in the art will understand that such a customization code database 208 may include any number of entries or additional fields.

The particular tabular representation of a customization code database 208 depicted in FIG. 8 defines a number of fields for each of the entries or records. The fields may include: (i) a customization code field 800 that stores a representation uniquely identifying a particular customized configuration; (ii) a game type field 802 that stores a representation of the selected game type; (iii) a denomination field 804 that stores a representation of the selected default denomination that the gaming device will accept; (iv) a language field 806 that stores a representation of the selected language to be used by the gaming device; (iv) a currency field 808 that stores a representation of the selected currency to be used by the gaming device; (v) a noise level field 810 that stores a representation of a description of a sound effects volume of the gaming device; and (vi) a font size field 812 that stores a representation of the size that characters will be displayed on the gaming device.

The example customization code database 208 of FIG. 8 provides example data to illustrate the meaning of the information stored in this database embodiment. A customization code 800 (i.e. C5006, C9224, C8331) may be used to identify and index customized configurations entered by players. Examples of game types include reel slots, video poker, and blackjack. Example denominations include $1.00, $0.25, and $5.00. Example languages include English and Japanese, and example currencies include the U.S. dollar and the yen. Example noise levels include high, medium, and low and example font sizes include medium, small and large.

3. Game Database

Although not illustrated with a detailed example, some embodiments of the present invention may include a game database 210 as indicated in FIG. 2. A game database 210 may be used to store the configurable features of a gaming device where there are multiple different types of games of multiple different types of gaming devices. Such a database would list the different configurable features for each type of game and then each of the possible values for each feature. A game database 210 may be used as a data source to assemble, for example, a web page that looks like the screen image of FIG. 4. Alternatively, the same screen image could be generated without a game database 210. However, where there are many different game types, using a game database 201 may reduce and simplify the resources required to generate screen images similar to that of FIG. 4.

E. Process Description

The system discussed above, including the hardware components and the databases, are useful to perform the methods of the invention. However, it should be understood that not all of the above described components and databases are necessary to perform any of the present invention's methods. In fact, in some embodiments, none of the above described system is required to practice the invention's methods. The system described above is an example of a system that would be useful in practicing the invention's methods. For example, the player database 210 described above is useful for tracking players and information about them, but it is not absolutely necessary to have such a database in order to perform the methods of the invention. In other words, the methods described below may be practiced using a conventional player tracking list in conjunction with a casino's conventional accounting system.

Figure 9:
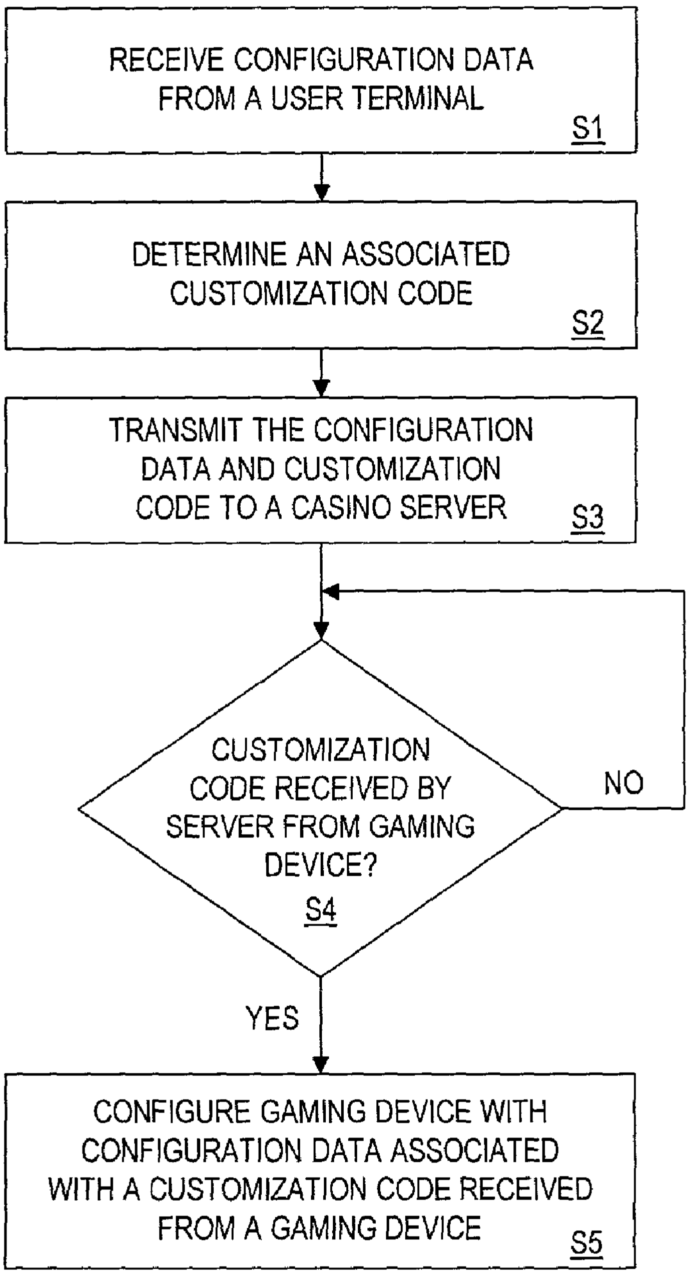
FIG. 9 is a flow diagram illustrating an exemplary process for remotely customizing a gaming device according to and for use in some embodiments of the present invention.

Referring to FIG. 9, a flow chart is depicted that represents some embodiments of the present invention that may be performed by the central controller 102 (FIGS. 1A and 1B), an external third-party, and/or an integrated third-party entity/device such as a third-party service provider server 118. It must be understood that the particular arrangement of elements in the flow chart of FIG. 9, as well as the order of example steps of various methods discussed herein, is not meant to imply a fixed order, sequence, and/or timing to the steps; embodiments of the present invention can be practiced in any order, sequence, and/or timing that is practicable.

In general terms and referring to FIG. 9, method steps of an embodiment of the present invention may be summarized as follows. In Step S1, the central controller 102 receives configuration data from a player at a user terminal 106. In Step S2, a customization code associated with the configuration data is determined. In Step S3, the configuration data and the associated customization code are transmitted from the central controller 102 to a casino server 112. In Step S4, the casino server 112 waits for a request, including a customization code, from a gaming device 120 to configure the gaming device 120. In Step S5, the gaming device 120 is actually configured according to the configuration data associated with the received customization code.

In the subsections that follow, each of these five steps will now be discussed in greater detail. Note that not all five of these steps are required to perform the method of the present invention and that additional and/or alternative steps are also discussed below. Also note that the above general steps represent features of only some of the embodiments of the present invention and that they may be combined and/or subdivided in any number of different ways so that the method includes more or fewer actual steps. For example, in some embodiments many additional steps may be added to update and maintain the databases described above, but as indicated, it is not necessary to use the above described databases in all embodiments of the invention. In other words, the methods of the present invention may contain any number of steps that are practicable to implement the processes described herein. The methods of the present invention are now discussed in detail.

1. Receive Configuration Data From A User Terminal

In step S1, a player logs on to the central controller 102 with the user terminal 106 and communicates his configuration data. The user terminal 106 may include a personal computer, personal digital assistant, a telephone, a kiosk, an ATM, a slot machine, a vending machine, etc. The central controller 102, may include a website accessible via the user terminal 106, wherein the user may select a number of customization options for a gaming device 102. By customizing a gaming device 120, a user has the opportunity to select a game he likes. He also has the opportunity to pre-configure a gaming device to operate in a manner that is convenient and pleasing to his senses. For example, the user may pre-configure the gaming device 120 to print text in his native language. The user may set the decibel levels of a gaming device's sound effects so that they are neither too loud nor too soft. Some other possible customizations include configurable features such as: type of game played (deuces-wild, jacks or better, video reel, etc.), speed at which the reels spin, number of coins played as a default (game denomination), game rules, game variations, music level of the game, sounds types generated by the game, game colors, game lighting, amount of help offered by the game, frequency with which bonus levels are reached, duration of bonus levels, whether or not the top jackpot is paid as a lump sum or installment, whether or not team members receive a bonus when the player hits a payout, format of the complimentary benefits received (e.g. cash, merchandise, frequent flyer miles, etc.), payout structure (e.g. 6 coins for a flush and 9 coins for a full house, rather than 5 coins for a flush and 10 coins for a full house), extra payout options (e.g. small payment for four card straight flushes), language or choice of currency, starting point of game (e.g. always start with two pair or three card royal), automatic player decisions (e.g. draw one card to a flush unless there is a pair of jacks or better, in which case the jacks are held). In addition to the features that are chosen by the players, the casino may also set numerous parameters for the player such as: hold percentage of the machine, rate at which complimentaries accumulate (e.g. 2% of coin-in rather than 1%), game eligibility (e.g. games which lock out play from anyone but high-rollers), and complimentary award rules (e.g. one player gets a bottle of wine sent to his room if he ever loses more than $1,000 in one hour, while another player gets a free spin every time he misses a one card draw to a royal flush on any deuces wild machine).

There are many possible ways in which a player might select customizations. A web site on the central controller 102 may display multiple menus, each menu providing choices of embodiments for a particular feature as depicted in FIG. 4. For example, a language menu may have the choices of English, Spanish, Chinese, or Japanese. A font size menu may have the choices of large, medium, or small. Menus may also have an "other" choice, allowing a user to select from less common choices (e.g. Swahili) or to key in their own choices, such as a particular point size for font.

In some embodiments, rather than making choices on website residing on the central controller 102, a player may download to the user terminal 106 (or a player device 512) software allowing for customization. The software may guide the player through a series of feature menus and store and/or upload the player's selections.

In some embodiments, the player may select features over the phone by, for example, listening to a pre-recorded menu of feature choices and then pressing a number on the phone's keypad corresponding to the desired choice. For example, the player may press "5" to select a five-reel slot game when asked to select a preferred number of reels. The player may press "0" to select a million-dollar jackpot when asked to select a preferred jackpot size. The player may also select features not on any prerecorded menu by keying in a relevant sequence of numbers. For example, the player may key in "175000" to select a maximum jackpot of $175,000, even when there is no pre-recorded choice for a $175,000 jackpot.

In some embodiments of the present invention the player may choose from a number of previously customized configurations. For example, one configuration might describe a quarter denomination, five-reel video slot machine, with standard symbols, three pay lines, and a four-coin maximum wager. The player may choose this configuration in its totality without having to individually choose the coin denomination, the number of reels, etc. In fact, anytime a player customizes a gaming device 120 configuration, the configuration may be listed on the central controller's website for another player to select. Of course, once a player selects a configuration, he may be free to change individual features.

Configurations listed on a central controller's website, or anywhere else, may have associated performance indicators. For example, a player may report that using "configuration #329", he won $2000. Seeing the high performance of configuration #329, another player may choose to select it for himself. Performance may be indicated using dollar figures, varying numbers of stars, colors, votes, etc. For example, five stars, gold, and 10,000 votes may all be indications that a particular configuration has performed well. Performance may be self-reported by players, or may be reported automatically by a gaming device 106 once a player has finished a gambling session using a particular configuration. Players may also self-report with gaming devices 106 providing occasional verification of the accuracy of players' reports. Individual players may gain reputations as experts at configuring gaming devices 106. Their advice and their configurations may be sought after. Players therefore may have their own ratings indicated by dollar figures, stars, colors, votes, etc.

Use of certain configurations may intentionally be restricted. This may be done to limit the number of players attempting to play on gaming devices 106 that are of a limited quantity within the casino. Additionally, use of certain configurations may be intentionally restricted because only a certain number of gaming devices 106 at a given casino location may be capable of supporting those configurations. For example, a mechanical slot machine will be unable to support video features. If too many players were to select a particular configuration, or even a particular feature, some might have difficulty locating an available machine to support their configuration. Configurations may be made more widely available by allowing players to select times, dates, and geographic regions for their gambling activities. Then, players gambling at different times or in different places need not compete for the same machines to support like configurations.

Another reason that the use of configurations may be intentionally restricted is that being the only one, or one of only a few players to "own" a particular configuration may be psychologically pleasing to a player. Therefore, other players may be restricted from viewing or using his configuration. It is possible that a first player would pay another player for access to his configuration. A player might also pay the central controller for access to a configuration, or for information about high performing configurations. Particular casinos, or particular device manufacturers may enjoy exclusive rights to certain configurations, even when other casinos or manufactures would be technically capable of supporting the configurations. A player who desired to use a certain configuration may then have a reason to play at one casino over another.

While selecting various features or configurations in some embodiments, a player may have the opportunity to test the configurations using the user terminal 106. For example, when the player selects a symbol-size, he may view symbols on his user terminal 106 at the size they would actually appear on a gaming device. When the player selects a reel-speed, he may view graphical reels spinning at the same speed they would on an actual gaming device.

In some embodiments, the user terminal 106 may display a comprehensive or complete graphical representation of a gaming device 120 to aid in the selection of feature values. As outcome generation is simulated, the player may change various features using graphical interface controls, i.e. by clicking, dragging, or otherwise selecting certain areas of the graphical representation of the gaming device. For example, suppose the reels are spinning on the user terminal's display screen. The player may take his mouse and drag it downwards along the surface of a spinning reel, much as a person might drag his hand along the wheel of a bicycle to make it spin. The effect would be to increase the speed of the reel's spinning. The player may change the symbol size by clicking on a corner of a lemon symbol, for example, and dragging the corner away from the center of the symbol, causing the entire symbol to enlarge. A player might create an extra reel by clicking on one reel and dragging it right, creating another reel. Alternatively, the player might click on a reel and use a copy and paste function, much like those found in many word processing programs. Of course, there are many other ways for a player to interact with a graphical representation of a gaming device in order to customize feature values.

A graphical representation of a gaming device 120 also allows a player to engage in mock gambling sessions using his selected configuration. If one configuration does not win for the player in a mock session, the player may choose another configuration. He may keep choosing different configurations until he has found one he considers lucky.

In some embodiments, a player at a gaming device 120 may be an attractive marketing target for a number of reasons. First, the player is typically a captive audience, with eyes fixated on the game at hand. Secondly, a marketer may have advanced knowledge about the player from a player's player tracking card. This allows a marketer to better target advertisements and offers to a player. Third, the gaming device gives the marketer an opportunity to provide immediate benefits to a player in exchange for his attention or his business. These benefits might take the form of cash, gambling tokens, extra bonus symbols, etc. Fourth, the player may be highly motivated to accept from the marketers the offered benefits and their associated conditions. The player may, for example, have suffered a large gambling loss and wish to recover the loss by accepting a marketing offer. Fifth, a player can make a payment at a gaming device 120.

Since gaming devices are an ideal place for marketers to make pitches to players, players may provide advanced guidance to potential marketers. The player may answer questions about his age, marital status, financial status, number of children, home ownership, car ownership, medical conditions, and so on. He may indicate the types of products in which he is interested. For example, he may mention that he is looking to have his roof re-shingled, or that he is looking for a new life insurance policy. Player supplied information is a way for a player to customize the ads and the offers he will receive, much as he also customizes the operation of the gaming device. Once the player has received various promotions and had a chance to respond or ignore them, the central controller 102 might update a user profile based on his responses. Analysis of the player responses may allow for better targeting of promotions in the future towards that player.

2. Determine an Associated Customization Code

In step S2, the central controller 102 assigns a customization code to each gaming device configuration. The code may be in the form of any sequence of letters, numerals, punctuation, and other symbols. Examples of codes according to the present invention include, "123456," "C123456," "ABCDEF," and "*$%#@Q%." Codes may be of any length. In some embodiments, codes may be limited in length and symbol usage so that they may be easily memorized by a player. For example, the player's telephone or social security number may be used. Also, the symbols in codes may be restricted to those easily entered into a gaming device 120. For example, a player tracking card reader on a slot machine may contain a keypad with only numerals. Therefore, codes for that machine may be limited to numerals.

In some embodiments, a unique code may be assigned to each unique configuration. Since there may be more possible unique configurations than codes of a given length, certain codes may expire after a time so that they may be reused for new configurations. That is, code "123456" may correspond to a first configuration only for three weeks, after which it may be assigned to a new configuration. A code may correspond to different configurations depending on different circumstances. For example, the time of day, the geographic location, and the type of gaming device receiving the code may all determine the corresponding gaming device configuration. Advantageously, this may allow fewer codes to represent more unique gaming device configurations, since each code can now represent several device configurations. For example, "123456" may represent a five reel, $1 per bet configuration in Atlantic City, but may represent a three reel, quarter per bet configuration in Las Vegas.

When codes are assigned to configurations, the codes may simply be assigned in sequence according to the order in which configurations are defined by players. For example, a first configuration may be assigned the code "000129," while a configuration received immediately afterwards may be assigned the code "000130."

When a code is assigned to a configuration, a record may be created for the code and the configuration in a database such as that of FIG. 8. When a gaming device 120, casino server 112, or the central controller 102 later receives a code, it may simply examine the record in the database to determine the corresponding configuration.

In alternative embodiments, a code may actually contains configuration information. For example, each digit of a code may correspond to a different feature of a configuration. The first digit may indicate the game type, the second the font size, the third the wager size, and so on. Then, when a gaming device 106 receives a code, it need only interpret each segment of the code using a predefined table in order to configure itself properly. Such a table may be stored in the gaming device 120, the casino server 112, and/or the central controller 103.

In some embodiments, a first code is created such that it contains configuration information. However, the code may be very long, especially if there are many features that can be customized. Therefore, a second code may be created by compressing the first code according to a compression algorithm. Numerous compression algorithms for a sequence of bits or numerals are known in the art. When the gaming device 120 later receives the second code, it may reverse the compression algorithm to recover the first code and to deduce the configuration information from the first code. Of course, the casino server 112 or central controller 103 may perform the function of reversing the compression.

A particular configuration may be associated with a particular player. Thus, information about the player may be sufficient for a gaming device 120 to obtain configuration information. For example, a player's name may be stored in a database corresponding to a particular configuration. When the player later enters his name into a gaming device 120 (perhaps via his player tracking card), the gaming device 120 may find the player's name in the database and thereby obtain the corresponding configuration. Other player characteristics may be associated in a database with configurations. A player's biometric data, such as voice data, retinal scan data, or finger print data may be associated with a particular configuration. When a player subsequently provides biometric data to a gaming device 120, the gaming device 120 may look up the data in the configuration database to determine the player's preferred configuration.

A customization code may take the form of a bar code, or any other machine-readable code. The player may then print out the bar code from his user terminal 106. When the player subsequently inserts the bar code into a gaming device 120, the gaming device may obtain the player's customized configuration.

In some embodiments, a player may specify his own code to be associated with a particular configuration. For example, a player may label a configuration using easy to remember terms such as "samurai," or "Big Jackpot," or "xyz." In some embodiments, a customization code may only describe particular features that a player has selected. Other features may then take on default values. For example, if a player has only selected the number of reels, a code might read "NR5," where "NR" stands for "number of reels," and "5" indicates the desired number. Since the code does not describe other features, these may take on default values.

3. Transmit The Configuration Data And Customization Code To A Casino Server

In step S3, once a customization code has been associated with a particular configuration, the code and the configuration data may be transmitted to a casino server 112, and/or a gaming device 120. Transmission may occur via the Internet, email, phone, fax, or any other mode of communication. In some embodiments, the code and customization data are transmitted immediately after they have been generated. In other embodiments, a gaming device 120 may only receive configuration data after a player has entered a code, and the gaming device 120 has sent the code to the casino server 112 and/or the central controller 102.

In embodiments where a customization code contains information about a gaming device configuration, the central controller 102 need not necessarily transmit both configuration data and the customization code, since a gaming device 120 or casino server 112 may be able to derive one from the other according to predefined rules.

4. Receive the Customization Code at the Casino Server From a Gaming Device

In step S4, the system waits for a configuration request from a player. When a player sits down at a gaming device 120, he may enter his customization code in order to have the gaming device assume the player's preferred features. The player may enter the code in a number of ways including: keying in the code via a keypad or touch screen, speaking the code into a microphone, whereby it is interpreted using voice recognition software, inserting a bar code into the gaming device 120, inserting into the gaming device 120 a magnetic strip containing the code, inserting into the gaming device 120 a floppy disc, CD, DVD or other storage medium containing the code, and/or wirelessly transmitting the code to the gaming device 120 using player device 512 such as a cell phone, PDA, two-way pager, or other communications device.

If the gaming device 120 cannot interpret the code, the gaming device 120 may transmit the code to the casino server 112 and/or to the central controller 102. The casino server 112 or central controller 103 may then look up the code in a customization code database 208 such as that depicted in FIG. 8, and may retrieve the corresponding configuration information.

5. Configure the Gaming Device Based on the Configuration Data Corresponding to the Customization Code In step S5, the configuration data retrieved from the casino server 112 and/or the central controller 102, is transmitted to the gaming device so that it can configure itself accordingly. In some embodiments described above, the gaming device 120 already has all the information it needs to self-configure upon initially receiving the customization code from the player. Thus, in some embodiments, these final steps are not necessary to complete the methods of the present invention.

F. Additional Embodiments of the Invention

The following are example alternative variations which illustrate additional embodiments of the present invention. It should be understood that the particular variations described in this section can be combined with the different embodiments, or portions thereof, described above in any manner that is practicable. These examples do not constitute a definition or itemization of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

The present invention may include the additional step of verifying that the player is legally permitted to gamble. For example, if the player is unable to prove he is over the age of 18, he may not be permitted to access the customization website. Thus, the central controller 102 may, for example, consult a database of publicly available birth records. Alternatively the player may be required to provide a scan or a photograph of an ID, such as a driver's license or passport belonging to the player. Further, if the player possesses a certain item, such as a credit card, that, for example, is known to only be distributed on a restrictive basis, then the central controller 102 may infer the player's eligibility from the player's possession of the item.

In some embodiments, the remote controller may be equipped to print a generic or customized document describing the player's customized configuration and/or the customization code to enter into the gaming device. The document may include cashless gaming receipts or coupons with bar codes, for example, to provide the player with an incentive to bring the document with him to the casino. The consumer may insert the document, or a copy of it, into the gaming device to activate the customization of the gaming device and/or to redeem the coupons.

In some embodiments, a player device 512, such as a wireless PDA, may be used to activate the customization of the gaming device and it may alert the gaming device to the player's proximity using, for example, a wireless protocol (such as Bluetooth as described on the world wide web, at address bluetooth.com/dev/specifications.asp). Once identified, a consumer's customized configuration information may be automatically transferred to the gaming device. Alternatively, the device may be preprogrammed to be able to transfer an ID (e.g. player tracking information), a customization code, and/or an entire configuration to a gaming device, kiosk, or a slot server at the casino location. For example, a player may load a slot machine customization program onto his combination cell phone/PDA (such as the Kyorcera® SmartPhone® Model No. 6035). After having created a configuration for a slot machine, the player may walk around a casino "beaming" (via infrared transmissions) his configuration at slot machines. Gaming devices compatible with the system of the present invention may respond by lighting up and/or by playing audio welcoming the player by name and inviting the player to play "his" personally customized game. As indicated above, using a device that supports wireless protocols such as Bluetooth would eliminate the need to actively beam a player's configuration. By merely approaching an enabled gaming device, the player's device could trigger the gaming device to configure itself to the player's customized configuration. The cell phone/PDA may track and record the player's performance and winnings information for a given configuration and allow him to make adjustments to the configuration or entirely new configurations.

In some embodiments, the player may log onto the casino server 112 directly, bypassing the central controller 102. Alternatively, the player could log onto the gaming device directly, bypassing the casino server 112.

Although the system of the invention has been described as one or more gaming devices 120 networked to a casino server 112, the invention applies to other games and gaming environments. For example, the invention may be applied to table games, such as table poker and blackjack. In such embodiments, players may insert their player tracking cards into card readers corresponding to seats around, for example, a poker table. The casino server could access player preferences data and casino preferences data for the players, and transmit that data to a data terminal located at the dealer. The dealer could then modify the game or award payouts according to the preferences.

The present invention also applies to other environments or systems involving one or more data terminals networked to a central server to configure the terminals to identifiable users or operators. For example, the invention could be readily adapted to apply to networked video game systems, systems with point-of-sale terminals, and automatic teller machines (ATM). This eliminates the need for users or operators to manually enter configuration information during each and every session to configure the terminals.

In some embodiments, the customization data received by the central controller 102 may be forwarded to one or more slot machine manufacturers to be incorporated into newly manufactured gaming devices. For example, if the vast majority of players prefer larger font types, new machines might be designed with larger font types as a default.

The central controller's website may serve as a testing ground for new games. Device manufacturers, or casinos may present games or configurations that they are considering introducing, but for which they desire player feedback. Players may test the configurations, and rate them. Players may be paid or may receive other special privileges for doing so.

Once a player has selected a configuration, the central controller 102 may provide guidance to the player as to how to find gaming devices 120 capable of supporting the configuration. The central controller 102 may illuminate a path through a casino location and/or display a map showing visually where the player might go to find the gaming devices 120. The map might be large scale, showing, for example, the entire world, the U.S., or a particular state. The map might show smaller regions, such as the city of Las Vegas, or even the floor plan of a particular casino location. The map might contain other information such as how many of the desired gaming devices are in each region, how many are currently available, how many are likely to be available, how well they have paid out, and so on.

In alternative embodiments, information regarding a player's gaming experience at the customized gaming device 120 may be transmitted up to the casino server 112, or the central server 102 and the player may be given a code that he can use to later access the information from his user terminal 106. For example, if a video recording of a player winning a jackpot is captured by a camera and recorder in or near the gaming device 120, the gaming device 120 can provide the player with a code that allows him to access the casino server 112 to view the video at home via his user terminal 106. Other types of information that may be transmitted include gambling performance statistics, records of outcomes generated by the gaming device during the player's use of it, account information, customized configuration performance data, records of player decisions made during play (e.g. in video poker devices), analysis of player gambling performance, comparative data from other players, and the like. In some embodiments where targeted marketing information is presented to a player at the gaming device 120, there may be feedback or survey responses from the player that may be stored on or communicated back to the gaming device 120, casino server 112, central controller 102, and/or the third-party service provider server 118. This type of information may also be made accessible via a code provided to the player, the casino, and/or a third-party.

G. Conclusion

It is clear from the foregoing discussion that the disclosed systems and methods to facilitate remote customization of a gaming device in advance of arriving at a casino represents an improvement in the art of electronic commerce and gaming. While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense.

Further, even though only certain embodiments have been described in detail, those having ordinary skill in the art will certainly appreciate and understand that many modifications, changes, and enhancements are possible without departing from the teachings thereof. All such modifications are intended to be encompassed within the following claims.

What is claimed is:

1. A method of customizing a gaming device comprising:

receiving customization data from a user terminal;

wherein receiving customization data from a user terminal includes:

presenting a plurality of sets of customization options to a user, wherein presenting the plurality of sets of customization options includes presenting at least one performance indicator associated with each set of customization options, wherein each set defines a respective plurality of values, each value corresponding to a respective parameter, and further wherein the plurality of values of a given set are to be implemented simultaneously if the given set is selected by the user; and receiving, from the user, one selected set of customization options, the one set being selected from the plurality of sets of customization options;

determining an associated customization code; and transmitting the customization data and the associated customization code to a slot server, wherein the slot server is operable to configure a gaming device based on the customization data and the associated customization code.

2. The method of claim 1 wherein receiving customization data from a user terminal includes receiving customization data from a personal computer.

3. The method of claim 1 wherein receiving customization data from a user terminal includes receiving customization data from a device that includes a display and an I/O facility.

4. The method of claim 1 wherein receiving customization data from a user terminal includes receiving customization data from at least one of a personal digital assistant, a telephone, a cell phone, a kiosk, an automated teller machine, a gaming device, an arcade game, and a vending machine.

5. The method of claim 1 wherein receiving customization data from a user terminal further includes presenting customization options to a user via the user terminal.

6. The method of claim 5 wherein the customization options include at least one of a game type, a default game denomination, a game starting point, an automatic player decision, a color scheme, a level of help, a bonus frequency, a bonus duration, a speed of reel spin, a font size, a currency type, a sound type, a sound level, a language, a currency, a payout structure, a payout amount, a payout option, a team option, a comp format, and a jackpot probability.

7. The method of claim 1 wherein receiving customization data from a user terminal further includes presenting a website that displays at least one customization option to a user via the user terminal.

8. The method of claim 1 wherein receiving customization data from a user terminal further includes providing a website to a user that allows the user to indicate a selection of at least one customization option.

9. The method of claim 1 wherein receiving customization data from a user terminal further includes storing at least one customization selection of a user.

10. The method of claim 1 wherein receiving customization data from a user terminal further includes providing software to the user terminal that is operable to display at least one customization option to a user on the user terminal.

11. The method of claim 10 wherein providing software to the user terminal further includes providing software to the user terminal that is further operable to record at least one customization selection.

12. The method of claim 1, wherein the performance indicator may be in the form of at least one of an amount of dollars won with the associated set of customization options, a number of symbols, a color, a popularity rating, and a number of votes for the associated set of customization options.

13. The method of claim 1, wherein presenting the plurality of sets of customization options includes presenting a subset of a plurality of customization options from among a predefined list of sets of customization options.

14. The method of claim 13 wherein presenting the plurality of sets of customization options includes excluding from the presented sets of customization options at least one set of customization options from the predefined list of sets of customization options.

15. The method of claim 13 wherein the predefined list of sets of customization options include customization options that include at least one of a time specification, a date specification, and a location specification.

16. The method of claim 1 wherein receiving at least one selected set of customization options includes receiving a payment for a right to use the selected set of customization options.

17. The method of claim 1 wherein receiving customization data further includes presenting an example of a customization option being considered by a user.

18. The method of claim 1 wherein receiving customization data further includes allowing a user to play a mock version of a game on a simulated gaming device with the customization data applied via the user terminal.

19. The method of claim 1 wherein receiving customization data further includes gathering marketing data related to a user.

20. The method of claim 19 wherein gathering marketing data includes requesting information from the user and wherein the marketing data includes at least one of demographic information, contact information, health information, financial information, credit information, hobby information, personal association information, professional association information, education information, consumer information, and merchant relationship information.

21. The method of claim 1 wherein determining an associated customization code includes determining an associated customization code that is easily remembered by a user.

22. The method of claim 1 wherein determining an associated customization code includes associating a customization code specified by a user.

23. The method of claim 1 wherein determining an associated customization code includes retrieving a customization code from a database previously associated with a configuration related to the customization data.

24. The method of claim 1 wherein determining an associated customization code includes generating a unique code and associating the unique code with the customization data.

25. The method of claim 1 wherein determining an associated customization code includes generating a code representative of the customization data.

26. The method of claim 1 wherein determining an associated customization code includes generating a customization code that encodes the customization data.

27. The method of claim 1 wherein determining an associated customization code includes associating a customization code determined based on a unique characteristic of a user.

28. The method of claim 1 wherein determining an associated customization code includes using a player tracking number as the customization code.

29. The method of claim 1 wherein determining an associated customization code includes associating a customization code determined based on an identity of a user.

30. The method of claim 1 wherein transmitting the customization data and the associated customization code includes sending the customization data to a gaming device upon receiving the customization code from a user via the user performing at least one of:

keying in the customization code, speaking the customization code wherein the spoken customization code is interpreted using voice recognition software, inserting a bar code representative of the customization code into the gaming device, inserting into the gaming device a magnetic strip containing the customization code, inserting into the gaming device a storage medium containing the customization code, and wirelessly transmitting the customization code to the gaming device using a user communications device.

* * * * *